Sept. 13, 1932.   T. HINRICHSEN   1,877,402
DIRECTION INDICATOR
Filed Feb. 10, 1931
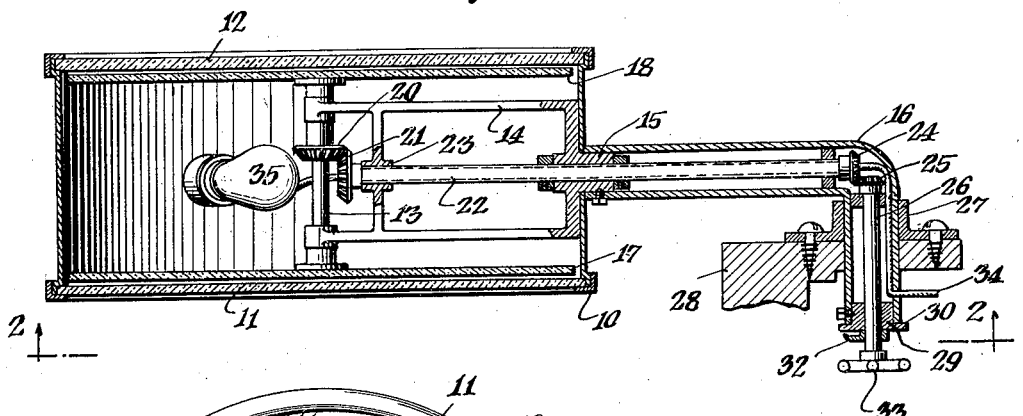
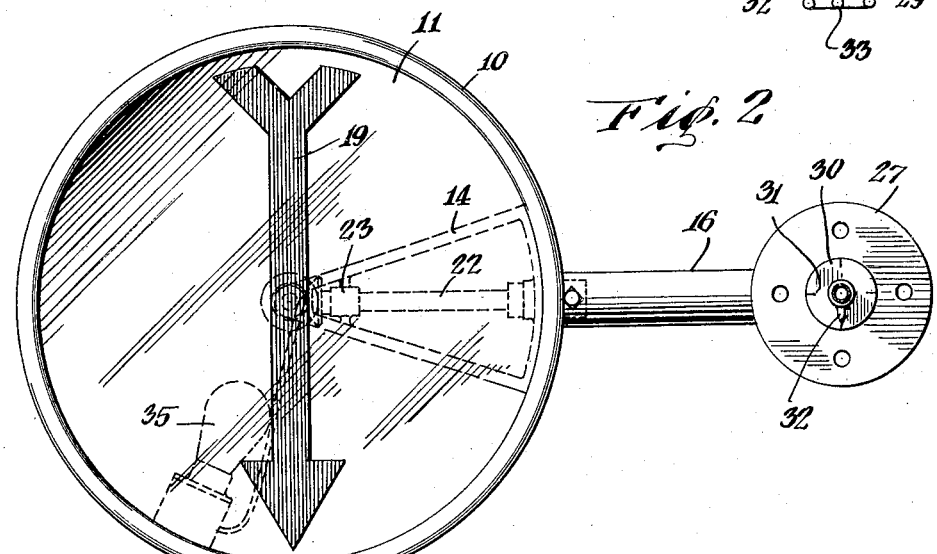
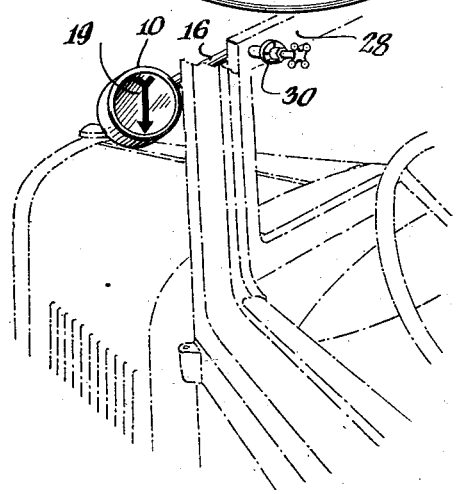
Inventor
Thomas Hinrichsen
By his Attorney Patented Sept. 13, 1932

1,877,402

UNITED STATES PATENT OFFICE

THOMAS HINRICHSEN, OF DAVENPORT, IOWA

DIRECTION INDICATOR

Application filed February 10, 1931. Serial No. 514,750.

This invention relates to improvements in signaling devices, particularly to a direction indicator for automobiles, and it is the principal object of my invention to provide an indicator to visibly announce by day and night an intended change in the direction of driving by the operator.

Another object of my invention is the provision of a signaling device including a means for visibly indicating to the operator the position of the signaling arrow.

A further object of my invention is the provision of a direction indicator for automobiles, trucks, or the like, by the use of which the signaling by hand, as it is now customary is avoided which necessitates keeping a window open and consequently exposes the operator and the interior of the car to the influence of the weather causing colds and also damage to the interior of the car.

A still further object of my invention is the provision of an automobile signal of simple, inexpensive construction, yet durable and highly efficient in its operation, and a device which can be quickly attached to any make of car now in use without necessitating material changes in its construction.

These and other objects and advantages of my invention will become more fully known as the description thereof proceeds and will then be specifically defined in the appended claim.

In the accompanying drawing forming a material part of this disclosure—

Fig. 1 is a sectional view of an automobile signaling device constructed according to my invention.

Fig. 2 is a rear elevation of the device seen along the arrows 2—2 of Figure 1.

Fig. 3 is a fragmentary perspective view of an automobile equipped with a signaling device according to the invention.

As illustrated a frame 10, preferably circular and made from metal or any other suitable material holds outer plates 11, 12, of clear glass forming the side walls of the device.

Within the casing a transversal axle 13 is rotatably arranged in the arms of a bracket 14, the boss 15 of which is held in a tubular extension of frame 10 extending outwardly and rearwardly to form a knee 16.

In the casing the axle 13 carries on its ends opaque glass discs 17, 18, provided with an arrow 19.

The transversal spindle or axle 13 carries intermediate its ends a bevel gear 20 in mesh with a bevel gear 21, at the end of a hollow shaft 22 rotatably guided in a bearing 23, and extending through the boss 15 into the horizontal branch of knee 16, where it carries a bevel gear 24 in mesh with a bevel gear 25 at the upper end of a shaft 26 within the vertical branch of the knee which is guided through a bushing 27 secured to the outer face of the automobile frame 28.

The opposite end of the knee is closed by a plug 29 having an outer front face or flange 30 carrying graduations 31 in front of which an index 32 on the end of shaft 26 indicates to the driver within the car the various positions of the arrow discs when the shaft 26 is turned or rotated by means of a hand wheel 33 at its extreme outer end.

A conductor cable 34 leads from a source of electricity to the socket of a light 35 within the housing 10, the cable passing through the hollow shaft 22.

The operation of my device will be understood from the above description and reference to the drawing, and it will be evident that the rotation of the hand wheel will bring the arrow discs into any desired portion to indicate the intention of an operator to make a turn and in which direction, and a glance on the graduated flange 30 will advise the operator that the arrow shows the direction in which he desires to turn.

It will be understood that I have described and shown the preferred form of my device only, and that I may make such changes in its construction as come within the scope of the appended claim without departure from my invention.

Having thus described my invention what I claim as new and desire to secure by Letters Patent is:

A direction indicator for vehicles comprising a circular frame having spaced transparent panels, a bracket fixed in said frame extending to its center, an axial spindle in said bracket carrying transparent discs each bearing direction indicia adjacent said panels, a tubular shaft in said bracket at a right angle to said spindle, a hollow radial arm extending outwardly from the bracket, said arm being bent at a right angle, means to engage the bent portion of said arm to a vehicle, a shaft in said bent portion, positive driving connections between said shafts and spindles, manual operable means for rotating the last named shaft whereby said discs may be rotated in unison, means to visually indicate the movement imparted by said manual means, an illuminating means in said frame, and a conductor to said illuminating means passing through said hollow shaft.

In witness whereof I have signed my name to this specification.

THOMAS HINRICHSEN.